(12) United States Patent
Mauchle et al.

(10) Patent No.: US 9,703,297 B2
(45) Date of Patent: Jul. 11, 2017

(54) CONTROL DEVICE FOR A POWDER SPRAY COATING DEVICE

(75) Inventors: Felix Mauchle, Abtwil (CH); Marlo Vasella, Sevelen (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 1002 days.

(21) Appl. No.: 14/007,206

(22) PCT Filed: Feb. 14, 2012

(86) PCT No.: PCT/US2012/024943
§ 371 (c)(1),
(2), (4) Date: Sep. 24, 2013

(87) PCT Pub. No.: WO2012/161762
PCT Pub. Date: Nov. 29, 2012

(65) Prior Publication Data
US 2014/0088769 A1 Mar. 27, 2014

(30) Foreign Application Priority Data
Feb. 14, 2011 (DE) .................. 10 2011 004 024

(51) Int. Cl.
*G05D 7/06* (2006.01)
*B05B 5/03* (2006.01)
(Continued)

(52) U.S. Cl.
CPC ........... *G05D 7/0605* (2013.01); *B05B 5/032* (2013.01); *B05B 5/10* (2013.01); *B05B 12/004* (2013.01); *B05B 12/08* (2013.01)

(58) Field of Classification Search
CPC ............... G05B 19/02; G05B 19/4148; G05B 19/41815; G05B 19/41885;
(Continued)

(56) References Cited

U.S. PATENT DOCUMENTS 4,192,728 A * 3/1980 Enomoto ............... C25D 13/24
204/480
4,809,426 A   3/1989 Takeuchi et al.
(Continued)

FOREIGN PATENT DOCUMENTS

EP    1084757 A2    3/2001
EP    2055391 A2    5/2009
(Continued)

OTHER PUBLICATIONS

Office Action mailed Aug. 26, 2014 for corresponding JP 2013-554530.
(Continued)

*Primary Examiner* — Robert Fennema
*Assistant Examiner* — Jay Jung
(74) *Attorney, Agent, or Firm* — Kinney & Lange, P.A.

(57) ABSTRACT

A control device for a powder spray coating device and a powder spray coating device are specified. With the aim of ensuring operational reliability during the coating operation of the powder spray coating device, while at the same time preserving the required coating efficiency, the solution according to the invention provides for the control device an assessment device, an enabling device and a first communication interface, the assessment device being designed for assessing on the basis of at least one code received from the powder spray coating device by means of the first communication interface whether or not reliable operation of the powder spray coating device is ensured and passing on the assessment result to the enabling device, the enabling device being designed in turn for enabling operation if the assessment result is positive.

13 Claims, 2 Drawing Sheets

(51) Int. Cl.
    *B05B 5/10*      (2006.01)
    *B05B 12/00*     (2006.01)
    *B05B 12/08*     (2006.01)
(58) Field of Classification Search
    CPC ........... G05B 2219/31139; G05B 2219/31228;
                G05B 2219/32145; G05B 2219/33105;
                G05B 2219/33107; G05B 2219/33113;
                                    G05B 2219/33126
    USPC ........................................................ 700/283
    See application file for complete search history.

(56) References Cited

U.S. PATENT DOCUMENTS

| | | | | |
|---|---|---|---|---|
| 5,022,590 | A * | 6/1991 | Buschor | B05B 5/0531 239/390 |
| 5,718,767 | A * | 2/1998 | Crum | B05B 13/0264 118/314 |
| 6,027,759 | A * | 2/2000 | Kwok | B01D 46/0086 427/421.1 |
| 6,758,423 | B1 * | 7/2004 | Perkins | B05B 5/00 239/67 |
| 2002/0197388 | A1 | 12/2002 | Brown et al. | |
| 2003/0160108 | A1 | 8/2003 | Lacchia et al. | |
| 2006/0052880 | A1 * | 3/2006 | Brosnahan | C23C 30/00 623/23.39 |
| 2007/0218198 | A1 * | 9/2007 | Moore | C23C 4/12 427/236 |
| 2007/0299558 | A1 * | 12/2007 | Nelson | F26B 3/30 700/259 |
| 2008/0223952 | A1 | 9/2008 | Wernli et al. | |
| 2009/0285983 | A1 | 11/2009 | Baldauf et al. | |
| 2010/0079252 | A1 | 4/2010 | Tsujimoto | |
| 2011/0080265 | A1 | 4/2011 | Isomura et al. | |

FOREIGN PATENT DOCUMENTS

| | | |
|---|---|---|
| GB | 2375981 A | 12/2002 |
| JP | 62120945 A | 6/1987 |
| JP | 2001504721 A | 4/2001 |
| JP | 2002337060 A | 11/2002 |
| JP | 2009136799 A | 6/2009 |
| JP | 2009199527 A | 9/2009 |
| JP | 2010010761 A | 1/2010 |
| JP | 2010501324 A | 1/2010 |
| JP | 2010086111 A | 4/2010 |

OTHER PUBLICATIONS

Corresponding International Application No. PCT/US2012/024943 Written Opinion and Search Report dated May 24, 2012.

* cited by examiner

CONTROL DEVICE FOR A POWDER SPRAY COATING DEVICE

RELATED APPLICATIONS

The present application is based on, and claims priority from International Application Number PCT/US2012/024943, filed Feb. 14, 2012, and German Application Number 102011004024.2, filed Feb. 14, 2011, the disclosure of which is hereby incorporated by reference herein in its entirety.

The present invention relates to a control device for a powder spray coating device and to a powder spray coating device for operating on such a control device.

It is known from the prior art to provide powder spraying devices, in particular spray guns and the like, for delivering a fluidized powder to an earthed surface to be coated with suitable high-voltage generators in order to impart high voltage to the coating powder that is leaving the powder spray coating device in the direction of the object to be coated.

Generally provided for this is an oscillator which generates a variable or fixed AC voltage of relatively low amplitude and generally passes it on to an oscillator output. At this oscillator output there is then a possibility of connecting the actual powder spray coating device, that is to say for example an aforementioned spray gun or some other handheld device. According to the type of chosen coating powder for the coating and according to the type and form of the object to be coated, variously designed spray guns are used for this, having different kinds of high-voltage generators, such as for example different high-voltage transformers and high-voltage cascade circuits, depending on variable parameters such as these. Moreover, it also depends on the intended use and what kind and length of feed line is used between the voltage-generating oscillator and the actual handheld device, that is to say for example the powder spray coating gun.

Depending on the intended use, it may therefore be required to operate different kinds of powder spray guns or other handheld devices in succession one after the other on the same oscillator, i.e. on the same voltage generator. Particularly on oscillators that offer possibilities for setting various parameters, it is necessary here to choose suitable values for these oscillator parameters according to the type of powder spraying device that is connected. For instance, it may be required in particular to adapt the amplitude and/or the frequency of the output oscillator voltage to the correspondingly used powder spray coating device, in particular powder spray gun, in order to achieve an optimal coating result. It may also be necessary, for some reasons, to set a possibly provided current limiting device within the oscillator in such a way that a certain maximum current, for example 100 µA, that flows toward earth via the powder cloud of the swirled coating powder, is not exceeded.

At this point, the devices known from the prior art have the problem that, due to the large number of different powder spray coating devices with different technical data and parameters, when connecting to an oscillator for delivering an oscillator voltage to such powder spray coating devices it is not ensured that the connected powder spray coating device is certain to operate with good coating efficiency on the respective oscillator without problems of operational reliability occurring. In particular in the case of oscillators with fixed values, but also in the case of variable oscillators, it cannot be ensured that a specific type of powder spray coating devices, for example a specific type of spray gun, can be certain to satisfy the reliability criteria at all when it is connected to a specific oscillator. In the case of variable oscillators there is the additional difficulty that the variation of various electrotechnical parameters by the user means that, if the parameters are wrongly chosen, it is not ensured even in the case of combinations of powder spray coating devices and oscillators that are admissible in principle that there will be sufficient operational reliability during the coating operation.

It is therefore the object of the present invention to provide a possible way of improving the operational reliability when operating a powder spray coating device for example on an oscillator with fixed electrical parameters or on an oscillator with variable, settable electrical parameters and achieve a good coating result or good coating efficiency.

This object is achieved according to the invention by the features of the claims, in particular by a control device as claimed in claim 1, a powder spray coating gun as claimed in claim 12 and a method as claimed in claim 16.

According to the invention, a control device is provided, having an assessment device for assessing the operational reliability, an enabling device for enabling operation and a first communication interface for data reception and/or for data exchange with a powder spray coating device connected thereto. The first communication interface of the control device according to the invention is in this case designed for receiving at least one code from the powder spray coating device and passing it on to the assessment device of the control device. The assessment device is in turn designed for assessing the at least one transmitted code as to whether or not reliable operation of the powder spray coating device is ensured. If reliable operation is ensured, the assessment device passes on the positive assessment result to an enabling device; correspondingly, a negative assessment result is passed on to this enabling device by the assessment device if the assessment device has established that reliable operation is not ensured. The enabling device is in turn designed to enable operation only when there is a positive assessment result. To obtain the assessment result, the code received by the first communication interface from the powder spray coating device may be compared in particular with a specified or specifiable comparative code. This comparative code may be, for example, in an oscillator specifically assigned to such a control device according to the invention. By assessing within the control device whether such a comparative code belonging to an oscillator that is specifically assigned to the control device satisfies the reliability criteria which are necessary for operating the connected powder spray coating device and of which the assessment device is informed by transmission of the code from the powder spray coating device, it is ensured by such a control device according to the invention that operation of the connected powder spray coating device on the respective oscillator is only possible if certain specifiable or specified reliability criteria are satisfied.

It may also be envisaged according to the invention to provide a powder spray coating device for operating on a control device with a second communication interface and a coding device connected to the second communication interface. The second communication interface serves here for connection to a first communication interface of a control device. The coding device is designed here for the purpose of generating at least one code, in particular an identification code or an operational data code, and outputting it to the control device via the second communication interface.

Advantageous developments of the device according to the invention are specified in the subclaims.

For example, it is provided that the at least one code is an identification code. A type code, a serial number or a device number of the respective powder spray gun come into consideration here in particular. The transmission of such an identification code to the control device according to the invention then allows an assessment to take place on the basis of this identification code as to whether the respective coating device type or an individual coating device from a group of identical coating device types is approved for operation on an oscillator specifically assigned to the control device, i.e. whether the reliability criteria necessary for the coating operation are satisfied.

It is similarly conceivable to transmit in addition to such an identification code, or else exclusively, a code which is an operational data code. Coming into consideration in particular as such operational data codes are an instantaneous temperature, maximum temperature, minimum temperature or operating time code. For instance, if such an operational data code is transmitted, it can be established whether the connected coating device has an operating temperature at a given instant that makes reliable operation possible. It is similarly possible, if a maximum temperature code is transmitted as the operational data code, to establish whether the respective coating device has ever exceeded a maximum temperature. If this is the case, an assessment of this transmitted maximum temperature code may proceed to ascertain whether operational reliability with such a coating device, in particular a powder spray gun, is still ensured. A similar situation applies analogously to the transmission of a minimum temperature code. On the basis of a transmitted operating time code, it is possible to assess whether or not a maximum time of use or operating time for the respective connected powder spray coating device has already been exceeded. If such an operating time that is the maximum admissible for reliability reasons has been exceeded, it is then possible not to enable the operation of this powder spray coating device.

With regard to the particular configuration of the enabling device, it may be envisaged to design it as a switching device. Transistor or relay switching devices or the like come into consideration for example as such switching devices. It may be envisaged here to arrange such a switching device between the oscillator for generating an oscillating voltage and the powder spray coating device itself. Coming into consideration for this in particular is a feed line for feeding the voltage generated by the oscillator to the powder spray coating device or a return line, in particular a reference potential line. It may therefore be envisaged here in particular, for the purpose of enabling operation when an assessment that reliable operation is possible has taken place, to switch the switching device through, so that the voltage generated by the oscillator is present at the powder spray coating device.

Equally well, however, it may also be envisaged to design the enabling device in such a way that it is only by the enabling device that the oscillator is activated to generate an oscillating voltage to enable operation.

In an advantageous way, it is envisaged also to design the enabling device for interrupting operation if the assessment result is or becomes negative. For this purpose, codes from the powder spray coating device are continually received during operation of the powder spray coating device on the oscillator. These codes are consequently also assessed in the assessment device during coating operation to ascertain whether reliable operation is still possible. For example, it is possible to interrupt coating operation by means of the enabling device if a maximum operating temperature is exceeded while operation is in progress. The same is possible if an operating time that is the maximum admissible for reliability reasons is exceeded.

In a particularly advantageous way, it may also be possible that the control device or the first communication interface of the control device is designed for transmitting a disabling command to the powder spray coating device if the assessment result is negative, i.e. if it has been established that reliable operation of the powder spray coating device is not possible or no longer possible. For example if a maximum admissible accumulated operating time is exceeded, it is then possible to transmit such a disabling command to the powder spray coating device, the powder spray coating device in this case being designed to prevent further operation of its own accord after receiving such a disabling command. It may then be envisaged to arrange for a powder spray coating device disabled in such a way to undergo expert maintenance or repair, it then being possible to reactivate this disabled powder spray coating device if it is established that reliable operation with the specific powder spray coating device is still possible.

Furthermore, it may be provided that the first communication interface of the control device is designed for transmitting a read-out command to the powder spray coating device. An assessment of such a read-out command taking place within the powder spray coating device then allows, for example, a specific code, such as an identification code or an operational data code, to be output. It is thereby possible to use various kinds of codes for assessing operational reliability within the assessment device at the same time or at different times.

Furthermore, it may also be envisaged to provide the control device additionally with a supervising interface. Such a supervising interface serves for connecting the control device to a supervising device, it being possible for a supervising device to be, for example, a remote maintenance installation or a higher-level control. This may advantageously take place whenever, for example, further characteristic variables are to be used for assessing operational reliability, and then, in combination with the assessment within the assessment device of the control device, together lead to operation being enabled or not enabled.

In particular, it may be envisaged here to design the supervising interface for receiving a supervising command for disabling operation. This is of advantage if a higher-level control that is connected for example to the supervising interface detects that it is no longer reliable for the powder spray coating device to be operated, for example in the case of an emergency shutdown taking place.

It is similarly possible to design the supervising interface such that it receives a supervising command for enabling operation. This is of advantage in particular whenever, for example, it is established by means of a remote maintenance unit connected to the supervising interface that, for example in spite of a possibly exceeded maximum temperature, it is still acceptable for the powder spray coating device to be operated on a specific oscillator.

It may similarly be provided that the coding device of the powder spray coating device is designed for receiving a read-out command from the control device and generating a code corresponding to the read-out command and then outputting it to the control device.

Within the powder spray coating device there may also be provided an operating time detecting unit and an operating time storing unit, assigned to this operating time detecting unit and connected to the coding device. The operating time detecting unit advantageously cumulatively detects the operating time of the powder spray coating device and stores this detected operating time in the operating time storing unit. For example, when a corresponding read-out command is received, the coding device then generates from the operating time read out from the operating time storing unit an operating time code and transmits it to the control device.

In a similar way, it may be envisaged to provide the powder spray coating device with a temperature detecting unit for detecting the operating temperature and a temperature storing unit, connected to the coding device. Once again, when a corresponding read-out command is received, for example, a detected temperature, in particular a detected minimum or maximum temperature, is then read out from the temperature storing unit and a corresponding operational data code, that is to say a temperature data code, is generated within the coding device and output to the control device.

An exemplary embodiment of the present invention is explained in more detail below on the basis of a drawing, in which.

Figure 1:
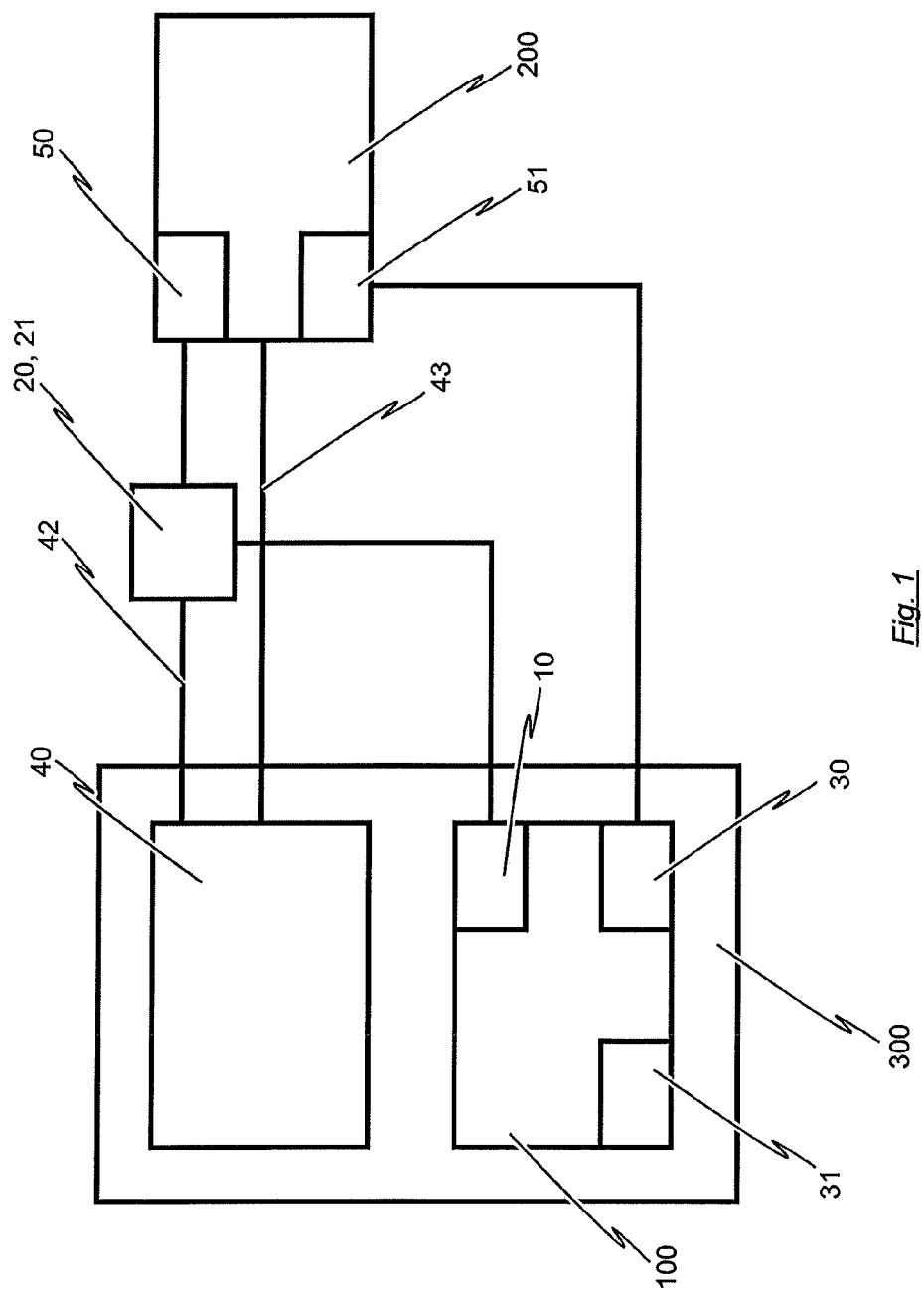
FIG. 1 shows a block diagram of the interconnection of a control device according to the invention and a powder spray coating device according to the invention as provided by a first exemplary embodiment of the invention.

As can be seen in FIG. 1, a first exemplary embodiment provides a control device 100, which has an assessment device, a detached enabling device 20, a first communication interface 30 and a supervising interface 31. Also provided in the first exemplary embodiment according to FIG. 1 is a powder spray coating device 200, which may be formed in particular as a powder spray gun or the like. The powder spray coating device 200 has a second communication interface 51 and a high-voltage generator 50. The high-voltage generator 50 is connected to an oscillator 40 via a feed line 42, such as a return line 43, it being possible for the oscillator to have fixed electrical parameters or to be of such configuration that it can be set in certain electrical parameters. Expediently, and as represented in FIG. 1, the oscillator 40 and the control device 100 are combined in a control-oscillator unit 300. In the first exemplary embodiment shown, according to FIG. 1, an enabling device 20, formed as a switching device 21, has been looped into the feed line, which feeds the oscillator voltage from the oscillator 40 to the high-voltage generator 50 of the powder spray coating device 200.

The switching device 21 is designed to be operated in the not switched-through state until the assessment device 10 has transmitted a positive assessment result to the enabling device 20, a positive assessment result meaning that it has been established that reliable operation of the powder spray coating device 200 on the given oscillator 40 is possible.

To make this assessment possible within the assessment device 10, a code is transmitted to the first communication interface 30 of the control device 100 from the second communication interface 51 of the powder spray coating device 200, possibly after receiving a corresponding read-out command. Coming into consideration here for example as possibilities for transmission are bus systems, in particular standard bus systems such as a CAN bus or the like, but also point-to-point connections, such as for example ETHERNET. However, possibilities other than the examples mentioned are also conceivable for ensuring a communication link between the first communication interface 30 of the control device 100 and the second communication interface 51 of the powder spray coating device 200; examples mentioned should not be understood as restrictive, either with respect to the physical connection or with respect to the transmission protocols used. The code fed to the assessment device 10, in particular an identification code or an operational data code, is subsequently assessed in the assessment device 10 as to whether or not reliable operation of the specific powder spray coating device 200 on the specific oscillator 40 is possible. If it is established that such reliable operation is ensured, an enabling signal is transmitted from the assessment device 10 to the enabling device 20 of the control device 100, whereupon the enabling device 20, formed as a switching device 21, switches through the oscillator voltage, generated by the oscillator 40, in the feed line 42, and consequently feeds it to the high-voltage generator 50 within the powder spray coating device 200.

Figure 2:
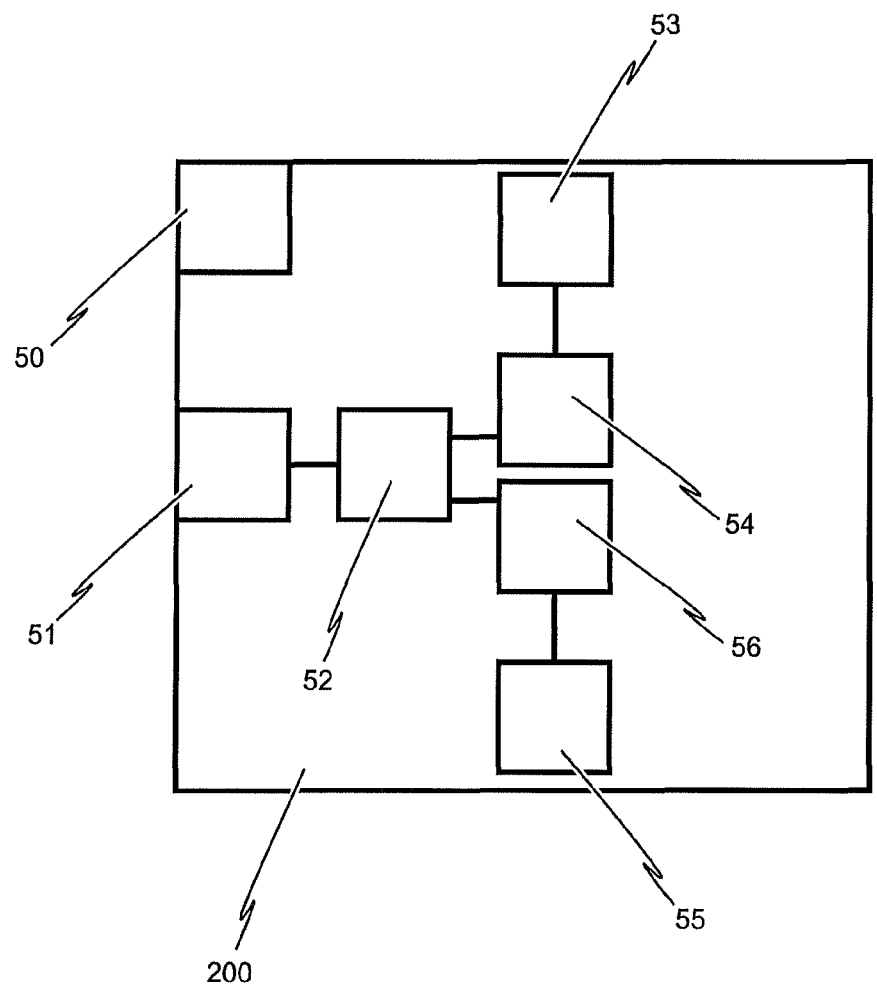
FIG. 2 shows the schematic structure of a powder spray coating device according to the invention as provided by a second exemplary embodiment.

In the second exemplary embodiment, represented in FIG. 2, there is shown a powder spray coating device 200, which can be connected to a correspondingly formed control device 100 and of course to a correspondingly formed oscillator 40. Once again, the powder spray coating device 200 according to the second exemplary embodiment represented in FIG. 2 has a high-voltage generator 50, for example an interconnection of a high-voltage transformer and a high-voltage cascade circuit. This high-voltage generator is designed to be connected to a correspondingly formed oscillator 40.

Also provided once again is a second communication interface 51, which is designed for being connected to a first communication interface 30 of a correspondingly configured control device 100. In addition, the powder spray coating device 200 according to the exemplary embodiment shown in FIG. 2 has a coding device 52, which serves the purpose of generating a code, in particular an identification code or an operational data code. This generation may take place, for example, as a response to a read-out command received by means of the second communication interface. Consequently, an evaluation of a corresponding read-out command may also take place within the coding device 52. It is thereby possible, for example, that, after receiving a corresponding read-out command, the coding device 52 transmits a serial number or a device number or a type code of the corresponding powder spray coating device 200. It may similarly be provided that a digital approval certificate, for example issued by a testing and certifying agency or the like, is stored within the coding device 52, containing for example information in coded form concerning on which types of oscillators 40 or with which parameters reliable operation of this specific powder spray coating device 200 is ensured.

As also represented in FIG. 2, the coding device 52 is additionally connected to a temperature storing unit 56 and an operating time storing unit 54. Coupled once again to the operating time storing unit 54 is an operating time detecting unit, which continually detects the operating time, for example in an accumulated form, and stores it in association with the operating time storing unit 54. When a corresponding read-out command is received, the coding device 52 may then transmit the detected operating time, whereby a connected control device 100 cannot enable an enabling device 20 to operate in the event that a prescribed or prescribable maximum operating time has been exceeded.

In a similar way, the temperature detecting unit 55 serves in conjunction with the temperature storing unit 56 for continually detecting and storing the operating temperature of the powder spray coating device 200, enabling of the oscillator voltage by means of a connected enabling device 20 likewise being prevented here if the temperature in a connected control device or in the assessment device 10 contained in a connected control device 100 goes below or exceeds certain temperature limits.

LIST OF DESIGNATIONS

10 assessment device
20 enabling device
21 switching device
30 first communication interface
31 supervising interface
40 oscillator
42 feed line
43 return line
50 high-voltage generator
51 second communication interface
32 coding device
53 operating time detecting unit
54 operating time storing unit
55 temperature detecting unit
56 temperature storing unit
100 control device
200 powder spray coating device
300 control and oscillator unit

The invention claimed is:

1. A powder spray coating system comprising a powder spray coating device and a control device for the powder spray coating device, the control device having the following:

an assessment device for assessing the operational reliability;
an enabling device for enabling operation; and
a first communication interface for data reception and/or for data exchange with the powder spray coating device connected thereto,
the first communication interface being designed for receiving at least one code from the powder spray coating device and passing it on to the assessment device, the assessment device being designed for assessing on the basis of the at least one code, in particular by comparison with a specified or specifiable comparative code, whether or not reliable operation of the powder coating device is ensured and for passing on the assessment result to the enabling device, and the enabling device being designed for enabling operation if the assessment result is positive,
the enabling device also being designed for interrupting operation if the assessment result is negative, and
the powder spray coating device having a second communication interface, which can be connected or is connected to the first communication interface of the control device, and a coding device, which is connected to the second communication interface, the coding device being designed for generating the at least one code, in particular in identification code or an operational data code, and outputting it to the control device.

2. The system as claimed in claim 1, the at least one code being an identification code, in particular a type code, a serial number or a device number.

3. The system as claimed in claim 1, the at least one code being an operational data code, in particular an instantaneous temperature, maximum temperature, minimum temperature or operating time code.

4. The system as claimed in claim 1, the enabling device being formed as a switching device, and the switching device being arranged in a feed line or in a return line between an oscillator for generating an oscillating voltage for the powder spray coating device and the powder spray coating device.

5. The system as claimed in claim 1, the enabling device being designed for activating an oscillator to generate an oscillating voltage to enable operation.

6. The system as claimed in claim 1, the first communication interface also been designed for transmitting a disabling command to the powder spray coating device if the assessment result is negative.

7. The system as claimed in claim 1, the first communication interface also being designed for transmitting a read-out command to the powder spray coating device.

8. The system as claimed in claim 1, the control device also having a supervising interface for connecting the control device to a supervising device.

9. The system as claimed in claim 1, the supervising interface being designed for receiving a supervising command for disabling operation.

10. The system as claimed in claim 1, the supervising interface being designed for receiving a supervising command for enabling operation.

11. The system as claimed in claim 1, the coding device also being designed for generating the at least one code in dependence on a read-out command received from the control device and outputting it to the control device.

12. The system as claimed in claim 1, the powder spray coating device also having an operating time detecting unit for detecting the operating time and an operating time storing unit, connected to the coding device, for storing a detected operating time in such a way that it can be read out.

13. The system as claimed in claim 1,
the powder spray coating device also having a temperature detecting unit for detecting the operating temperature and a temperature storing unit, connected to the coding device, for storing a detected temperature, in particular a minimum or maximum temperature, in such a way that it can be read out.

* * * * *